United States Patent
Helgeland

[11] Patent Number: 5,826,885
[45] Date of Patent: Oct. 27, 1998

[54] MAGNETIC FLUID SEALING DEVICE

[75] Inventor: Walter Helgeland, Quechee, Vt.

[73] Assignee: Rigaku/USA, Inc., Danvers, Mass.

[21] Appl. No.: 720,634

[22] Filed: Oct. 2, 1996

[51] Int. Cl.[6] ............................................. F16J 15/43
[52] U.S. Cl. ................................... 277/302; 277/410
[58] Field of Search .................... 277/1, 80, 235, 277/22

[56] References Cited

U.S. PATENT DOCUMENTS

| | | | |
|---|---|---|---|
| 3,612,630 | 10/1971 | Rosensweig | 308/10 |
| 3,620,584 | 11/1971 | Rosensweig | 308/187.1 |
| 3,734,578 | 5/1973 | Rosensweig | 308/10 |
| 3,810,055 | 5/1974 | Wright | 335/285 |
| 3,917,538 | 11/1975 | Rosensweig | 252/62.51 |
| 3,940,150 | 2/1976 | Martin et al. | 277/80 |
| 4,054,293 | 10/1977 | Hoeg et al. | 277/80 |
| 4,281,724 | 8/1981 | Garrett | 277/31 |
| 4,309,040 | 1/1982 | Pierrat | 277/80 |
| 4,527,805 | 7/1985 | Gowda et al. | 277/80 |
| 4,605,233 | 8/1986 | Sato | 277/80 |
| 4,865,334 | 9/1989 | Raj et al. | 277/80 |
| 4,995,622 | 2/1991 | Fuse | 277/80 |
| 5,007,513 | 4/1991 | Carlson | 277/80 |
| 5,557,900 | 9/1996 | Pop, Sr. | 310/165 |

FOREIGN PATENT DOCUMENTS

| | | | |
|---|---|---|---|
| 0051668 | 2/1990 | Japan | 277/80 |
| 3172617 | 7/1991 | Japan | 277/80 |
| 18527485 | 7/1993 | U.S.S.R. | 277/80 |

OTHER PUBLICATIONS

Genmark Pole Piece shown in drawings 94111810, 94111801 and 94111800 sold 16 Feb. 1995.

*Primary Examiner*—William A. Cuchlinski, Jr.
*Assistant Examiner*—John L. Beres
*Attorney, Agent, or Firm*—Hamilton, Brook, Smith & Reynolds, P.C.

[57] ABSTRACT

A magnetic fluid sealing device adapted to enable rotary motion to be coupled by a shaft between an ambient high pressure environment to a high temperature, low pressure environment. Gaps in the shaft are dynamically sealed by a magnetic seal which uses a thin walled pole piece, a high power magnet and magnetic fluid. The pole piece and an extension thereof form a vacuum envelope for the remainder of the device, eliminating the need for the usual O-ring static seals.

22 Claims, 2 Drawing Sheets

MAGNETIC FLUID SEALING DEVICE

BACKGROUND OF THE INVENTION

This invention relates to a magnetic fluid sealing device for sealing relatively movable surfaces of rotating shafts, sleeves and the like to maintain a pressure difference across seals or to prevent leakage of a lubricant or particles along the surfaces.

In relatively moving surfaces which may be lubricated, it is sometimes necessary to interpose seals therebetween to prevent leakage of a lubricant or particles or gas or to maintain a pressure difference across the seals where one of the surfaces such as a rotating shaft passes from one environment at a first pressure into a second environment at another pressure.

It has been suggested that magnetic fluid be employed as a dynamic seal in the gap between relatively movable surfaces. The magnetic fluid comprises (1) a carrier fluid such as water, a hydrocarbon, or a fluorocarbon, (2) a surfactant, such as a fatty acid, and (3) ferromagnetic particles such as iron oxide or ferrite dispersed in the carrier. The fluid is captured in the gap by magnetic flux generated by one or more permanent magnets separated by pole pieces. In such a magnetic fluid seal, as the relatively movable surfaces do not directly contact each other, they are subject to hardly any wear, whereby the serviceable life of the seal is remarkably extended in comparison with those of mechanical seals. In addition, it provides a positive seal. Therefore, the magnetic fluid seal is often applied to an apparatus used in the environment of a high vacuum such as X-ray tube apparatus.

Magnetic fluid sealing devices of this type are disclosed in U.S. Pat. No. 4,605,233 incorporated in its entirety herein by reference.

Some of the major disadvantages of the prior art are:

1. The need for a static O-ring seal between the housing and the dynamic rotary seal provided by the magnets and fluid. Rubber or other organic O-rings are susceptible to out-gassing in ultra-high vacuum applications. A typical solution to this problem is use of metallic O-rings; but these are difficult to assemble.
2. As the ambient temperature increases, out-gassing of materials used in the seals increases and the static sealing materials may be degraded or even decomposed. A typical solution to this problem is to water cool the seal, including providing cooling channels in the pole piece. This increases the size and cost of the seal as well as the complexity.

SUMMARY OF THE INVENTION

In accordance with the invention, a magnetic fluid sealing device is provided which uses a combination of materials and mechanical features which minimize the heat conduction from the system (hot wall and hot workload) to the temperature-sensitive region (magnetic fluid and magnetic seal area) of the device. The device also incorporates means to establish an isothermal regime in the temperature-sensitive region, and to lose heat efficiently from the isothermal region to the ambient atmosphere. This eliminates the need for water cooling in many applications and also allows the operating temperature of the magnetic fluid to be monitored easily, since there is very little temperature difference between the fluid region and the outside housing of the seal.

The seal incorporates a novel magnetic design which (a) requires no static vacuum seals between the housing and magnetic circuit elements, (b) eliminates outgassing from O-rings, magnets or other sealing materials, (c) minimizes the amount of magnetic fluid exposed to the vacuum system, and (d) provides multiple magnetic traps to prevent the ingress of magnetic fluid from the seal region to the low pressure side.

In accordance with a preferred embodiment of the invention, there is provided a magnet fluid sealing device comprising a housing which is disposed between the low pressure environment and the high pressure environment. An axially extending rotatable shaft is mounted in the housing, and a magnet fluid seal encloses the shaft. The fluid seal is composed of a pole piece and magnets radially encircling the shaft leaving a gap therebetween which is supplied with magnetic fluid. There is further provided a flange next to the side of the housing nearest the low pressure environment. The flange is used to mount the device to a fixture exposed to the low pressure environment. A thermal resistance is provided between the flange and the magnetic fluid seal to thermally isolate the fluid seal from the low pressure environment. In addition, the housing is in thermal contact with the pole piece to form a heat sink for the exchange of heat from the pole piece to the ambient atmosphere. Also a thin tubular wall portion of the pole piece extends from the housing to the flange to form the above-referenced thermal resistance between the flange and the magnetic fluid seal to thermally isolate the pole piece from the low pressure environment. The pole piece also has a thin wall section radially disposed between the shaft and the magnets which is sufficiently strong to support the pressure difference between the low pressure atmosphere and the high pressure atmosphere, but sufficiently thin to become magnetically saturated by the magnets, thereby providing a superior magnetic seal between the shaft and the magnets.

The nature, utility and further features of the invention will be more clearly apparent from the following detailed description with respect to a preferred embodiment of the invention when read in conjunction with the accompanying drawings.

DETAILED DESCRIPTION OF THE INVENTION

Figure 1:
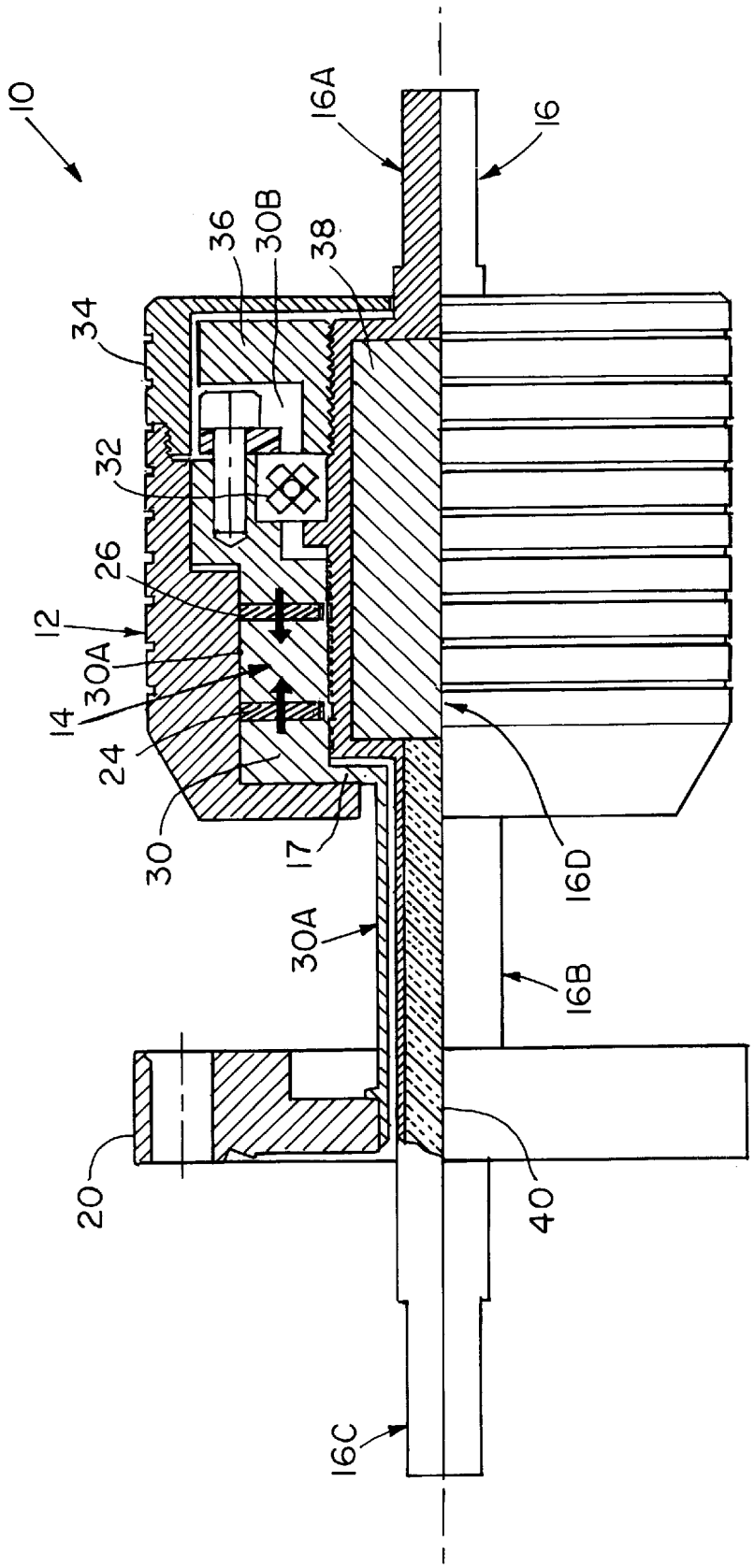
FIG. 1 is a longitudinal partial section of an embodiment of the device according to this invention.

Referring first to FIG. 1, a magnetic sealing device 10 according to this invention is housed in a generally cylindrical housing comprising an aluminum housing 12 and aluminum end cap 34. A rotatable shaft 16 is inserted through a central opening in the end cap 34. The left end of the shaft 16 extends through an opening in flange 20 which is adapted to mount the device 10 in a vacuum environment at elevated temperatures. The right end thereof as viewed in FIG. 1, is adapted to be disposed in a normal atmospheric environment at ambient temperatures. Note, since the device is radially symmetric, only the top half is shown in detail in FIG. 1. A single cross-roller bearing 32 secured by aluminum bearing nut 36 rotatably holds shaft 16 and provides a large resistance against force moments which would tend to tilt the shaft 16.

Within the housing, alternately disposed in series in the axial direction, are at least a pair of permanent magnets 24 and 26 separated by an annular pole piece 30.

Pole piece 30 is formed from magnetic stainless steel. On its outside diameter, the pole piece contains two grooves which are deep enough to fully contain magnets 24 and 26, efficiently capturing magnetic flux from the magnets. A unitary pole piece with segmented or button-shaped magnets 24 and 26 inserted into the grooves is the preferred construction, but it is also possible to use a built-up pole piece (central tube with outer rings slipped onto it) and full ring magnets. The unitary construction is preferred because manufacturing costs will be lower, since (a) only a single machined piece is required, and (2) a single standardized magnet component (button or segment) can be used in many different magnetic assemblies.

The pole piece 30 contains a first cylindrical cavity 30A ("sealing cavity") of diameter slightly larger than the outside diameter of shaft 16, and a second cavity ("bearing mount cavity") 30B. These cavities are coaxial, thereby establishing the overall alignment of the shaft 16, bearing region 30B and sealing region 30A.

The magnets 24 and 26 are arranged so that the polarity of the magnets on opposite side of the pole piece 30 is symmetrical with respect to the pole piece; i.e., the polarity of the opposite surfaces of the two adjoining magnets is the same as each other.

Some of the novel features of the FIG. 1 embodiment include, inter alia, the following:

1. minimizing conduction of heat between the flange 20 at the low pressure end toward the magnetic seal section 14. To this end, the pole piece 30 is provided with a thin walled tubular extension 30C which coaxially encircles shaft 16 in a section 16B of the shaft 16 extending from the pole piece 30 to the mounting flange 20.

Magnetic stainless steel is the preferred material for the outer wall 11 of shaft section 16B because it provides the combination of desirable properties, viz., cleanliness and vacuum compatibility, ferromagnetic permeability and relatively poor thermal conductivity.

Thermal insulation 40 may be provided within a tubular longitudinal opening provided in this section 16B of the shaft. In this manner two thermal resistances are formed between the normally hot flange 20 and hot shaft end 16C exposed to the low pressure or vacuum environment and the magnetic seal section 14 to minimize heat flow in this direction.

2. Maximizing the ability of the device to exchange heat from the housing 12 and 34 and the atmosphere end of the shaft 16 to the ambient atmosphere (heat sinking to ambient).

The principal heat sinks are the aluminum housing 12 and end cap 34. These provide a large surface area for the exchange of heat by conduction to the ambient atmosphere. A secondary heat sink is provided by the use of a carbon steel shaft section 16A at the atmosphere end. Although aluminum has high thermal conductivity, it cannot normally be used as the shaft material because it is too soft and too weak. Carbon steel is preferred over stainless steel since it has three times the thermal conductivity. Also, the aluminum bearing nut 36 has a large surface area, thereby maximizing the heat transfer from the carbon steel shaft to the inside of the aluminum end cap heatsink.

3. Providing pathways of high thermal conductivity (thermal sinks) to enable any heat which is able to pass through the thermal resistance to bypass the heat sensitive magnetic seal section.

Two thermal shunts are provided. First, the aluminum housing 12 wraps around the left end of the large-diameter portion of the magnetic seal section. Heat which flows from the thin-wall section 30C of the pole piece must flow radially outward through a transition region 17 before it can again flow axially toward the magnetic seal section.

The wrap-around section of aluminum housing 12 provides a thermal shunt from this transition region 17 to the principal heat sink. Second, the shaft at section 16D is provided with an aluminum core 38 which functions as a thermal shunt from the thin walled section of shaft 16B to the secondary heat sink 16A.

This combination of thermal resistors, shunts, and heat sinks results in a system in which (a) the heat transfer from flange 20 and shaft 16 to the seal 14 and bearing region 32 is minimized, and (b) temperature gradients within the seal and bearing region are also minimized. To verify these expectations, temperature measurements were made at a number of points within a test unit built according to this embodiment. With the flange and shaft maintained at 165° C. and ambient temperature at 30° C., temperatures in the range 45° C. to 50° C. were observed at five different locations within the seal and bearing region. 40° C. was observed at the atmosphere end of the shaft.

Another novel feature of the invention includes use of a crossed roller bearing. Placing the bearing 32 on the atmosphere side of the seal requires that the bearing have high stiffness; it must not allow the shaft 16 to tilt very much under radial loading because the portion of the shaft within the sealing region can move substantially off center, thereby weakening the dynamic seal. Bearings with large radial and axial play (e.g., radial ball bearings) must be avoided in favor of preloaded bearings (e.g., angular contact duplex bearings). To achieve high stiffness in conventional preloaded bearing sets, however, it is necessary to spread the bearings apart axially by means of matched-length spacers. This increases the overall length of the feedthrough, occupying more space in the overall vacuum system. The bearing preferred in this embodiment is a cross-roller bearing of the type manufactured by THK Corporation, Tokyo, Japan, which offers very high stiffness in an extremely short axial space. Because the bearing is contained within the region of low temperature gradient, the bearing temperature does not rise beyond safe limits. The same thermal improvements which protect the fluid seal region also protect the bearing and its lubricants.

Yet another novel feature of the preferred embodiment will now be described in connection with FIG. 2. This feature relates to the magnetic seal which eliminates virtual leaks and the possibility that magnets and other static sealing materials may be exposed to the vacuum. The central idea is that the pole piece 30 and the wall 30A of the vacuum envelope are integrated, i.e., they are both formed of the same piece of magnetic stainless steel and provide both functions.

Figure 2:
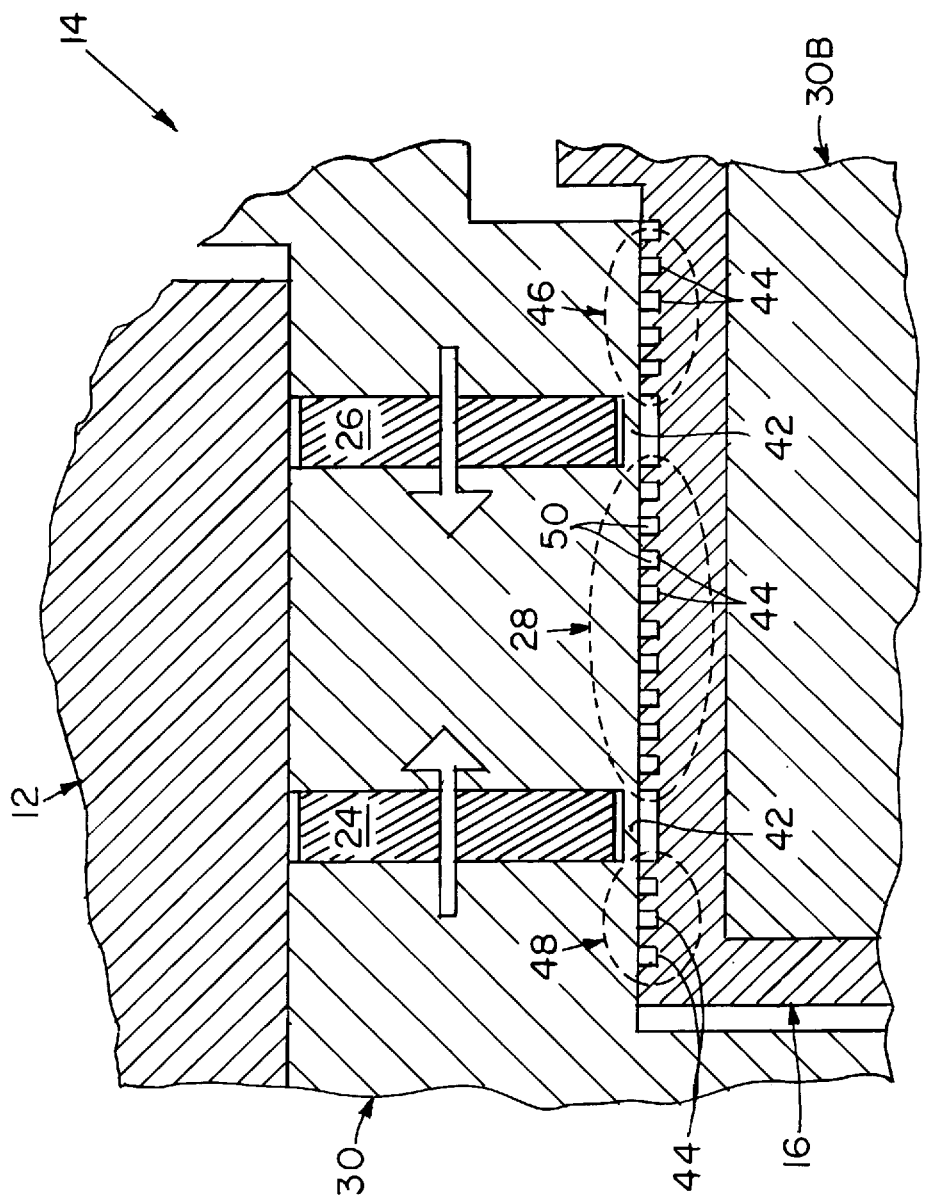
FIG. 2 is an enlarged detailed sectional view of the magnetic seal section of the invention.

In FIG. 2, the "thin-wall sections 42 of pole piece" are the regions which are most critical to understanding how this idea works. If a unitary pole piece construction is used, these sections are formed as an integral part of the pole piece. The magnet-holding grooves or gaps 44 are machined to a depth which leaves a wall thickness of 0.4 mm from the bottom of the magnet groove to the inside of the sealing cavity. The groove width (length of thin-wall section) is set according to the magnets used, e.g., 2.1 to 2.2 mm for 2.0 mm magnets.

If a built-up construction is used, a long tubular section of 0.4 mm wall thickness is required, and magnetic stainless rings would be slipped over this tube to complete the pole piece.

These thin walls 42 are strong enough to support the pressure difference across the device, i.e., between atmosphere and vacuum, while thin enough to become magnetically saturated by the two ring magnets 24 and 26. If very high saturation of the walls 42 is achieved, then the remaining magnetic energy will be sufficient to produce sufficient high flux levels to seal gaps 50.

In the prior art, no such walls were present, thus ensuring that magnetic shunts would not weaken the field in the annular gap between pole piece and shaft. Instead, maximum magnetic energy was made available to the sealing gaps by eliminating any magnetic shunts. However, this required that O-rings, epoxies or other static sealing means be provided to prevent the leakage of atmospheric gases around or through the magnet structure region and on into the vacuum system. The use in the present invention of thin shunt walls eliminates the need for all such static sealing means, together with the virtual leaks which naturally accompany such assemblies. However, it also raises the possibility that the magnetic energy in the sealing gaps 50 would be reduced (because of the shunt effect) to the point that the seal would not work. We have found, however, to the contrary, that if very high energy ring magnets are used (e.g., SmCo or NdBFe), then the total amount of magnetic energy in the system far exceeds what is required to produce a strong field in the sealing gaps, and some loss of energy in a magnetic shunt can be tolerated.

Computer simulation of the magnetic system was used to find a combination of design parameters which would allow a shunt wall to be used, while still providing high magnetic fields in the sealing gaps. A range of design parameters was found over which it was possible to achieve comfortably large magnetic fields (5 to 8 kilogauss) in the sealing gaps while still maintaining shunt wall thickness large enough to provide the strength and vacuum integrity required. More specifically, the following parameters and ranges are preferred:

1. The magnets 24 and 26 used were rare earth magnets (e.g., SmCo or NdBFe), with an energy product of 18 MGO or greater, formed in the shape of buttons 9.0 mm diameter ×2.0 mm thick.
2. The recommended pole piece material is magnetic stainless steel, e.g., 17-4PH, or any 400-series stainless steel.
3. The number of shaft grooves 44 should be a minimum of 4 and preferably 8 to 15. Groove depths of 0.5 mm and widths of 0.5 mm, with 0.5 mm spacing between grooves is preferred. The groove depth should be at least four times the radial gap between shaft and pole piece.

In a particular case, for example, a magnetic field strength of 5 to 8 kilogauss could be achieved in the sealing gaps 44 with about 16 kilogauss in the shunt wall, which was thick enough to be mechanically strong and stable, i.e., about 0.4 mm thick and 2.1 mm long.

In principle, the shunt-wall concept could be implemented using a single ring magnet, but much better results can be achieved using two ring magnets 24 and 26 with magnetic polarity opposed as indicated by the large arrows in FIG. 2. This opposed-field configuration provides very high gap fields in the "primary sealing region" between the magnets and somewhat reduced fields in the "secondary sealing region 46" and the "fluid trapping region 48." The opposed-field configuration also minimizes magnetic fields outside the device 10 and provides maximum resistance to weakening of the sealing gap fields by externally imposed magnetic fields. A larger number of ring magnets can be used, but two is a sufficient number if the energy in each is high enough.

When the device is assembled and end cap 34 is joined to housing 12 by an epoxy or other adhesive applied at interface 19, a measured amount of fluid (not shown) (sufficient to fill a limited number of sealing gaps 50) is placed on the shaft in the "secondary sealing region" 46, and the shaft is inserted into the pole piece. When the fluid-wetted section enters the pole piece, the fluid spreads evenly around the shaft 16 filling the gaps and forming isolated pockets of trapped air in the sealing gaps or grooves 50 of the shaft. A pressure differential is applied across the assembly (vacuum pumping on the flanged end), and some fluid is drawn further into the "primary sealing region" 28. It has been determined that only a few (e.g., four) stages are required to support the full pressure differential (1 atmosphere), provided the magnetic field strength is high enough, in the "primary sealing region." The sealing gaps 44 in the "secondary sealing region" also provide some degree of sealing, although these stages will be weaker than in the "primary sealing region," because the field strength in these gaps is less.

Some gaps at the left side of the "primary sealing region" may never be filled with fluid in normal operation. At the far left end of the magnetic seal section, the "fluid trapping region" also remains dry in normal operation. Under certain conditions, such as frequent, repetitive, rapid cycling of the vacuum system pressure from atmosphere to vacuum and back again, it is possible that small amounts of fluid will be transferred from the sealing gaps to the dry gaps. In such cases, all the originally dry gaps serve as traps, to hold any minute quantities of fluid within the seal, thereby preventing migration of fluid from the seal to the vacuum chamber.

Stainless steel is usually preferred as the material for the pole piece 30 and vacuum end of the shaft because of cleanliness and vacuum compatibility. Since these parts must also be ferromagnetic in order for the device to work, only certain stainless steel alloys are usable. The preferred material is 17-4PH alloy, also known as alloy 630. Stainless steel alloys of the so-called 400 series can also be used, and may be preferred in some instances, such as when very high hardness is desired in the shaft.

Magnetic alloys other than stainless steel could be used, but are not normally desired because of incompatibility with the high vacuum environment or other process environments (e.g., corrosive gases).

The atmosphere end of the shaft can be made of any material which has enough strength for the intended application, and which has substantially higher thermal conductivity than the vacuum end of the shaft.

The housing 12 and end cap 34 can be made of any material with high thermal conductivity compared to stainless steel. For example, copper or silver could be used, but these are very expensive compared to aluminum.

While a flange is depicted as the preferred means for mounting the device to a fixture, any well-known mechanism or method, such as welding or screwing may be used in place thereof. Note also that the sealing gaps 44 may alternatively be provided in the pole piece instead of in the shaft 16 for customers preferring a standard smooth shaft.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A magnetic fluid sealing device comprising:
 a) a housing;
 b) an axially extending shaft rotatably mounted in said housing and wherein one end of the shaft is adapted to be disposed at a low pressure environment and another end at a high pressure environment;
 c) a pole piece and magnets radially encircling said shaft;
 d) a magnetic fluid seal enclosing said shaft for magnetic sealing of any gaps between the shaft and the pole piece;
 e) a mounting means nearest the low pressure environment for mounting the device to a fixture, and wherein an integral section of the pole piece extends to the mounting means coaxially of the shaft forming with the pole piece a static vacuum tight envelope between the low pressure environment and the high pressure environment, except for said gaps which are sealed by said magnetic seal.

2. The device of claim 1 wherein the housing is in thermal contact with the pole piece and forms a heat sink for the exchange of heat to the ambient atmosphere.

3. The device of claim 1, wherein the mounting means is a flange, and the section is a thin walled tubular portion of the pole piece which forms a first thermal resistance between the flange and the seal.

4. The device of claim 1 wherein a portion of the shaft adjacent the seal comprises an outer tubular member of steel and an inner core of aluminum to provide a first thermal shunt between the ends of the shaft.

5. The device of claim 1, wherein the pole piece has a thin wall section radially disposed between the shaft and the magnets, the section being sufficiently strong to support the pressure difference between the low pressure atmosphere and the high pressure atmosphere, but sufficiently thin to become magnetically saturated by the magnets.

6. The device of claim 1, wherein a first portion of the shaft nearest the low pressure environment is formed of magnetic stainless steel, and a second portion of the shaft nearest the high pressure environment is formed of solid carbon steel.

7. The device of claim 6, wherein the shaft is cantilevered from, and rotatably supported by, cross-roller bearings disposed near the high pressure environment.

8. The device of claim 3, wherein the housing is formed of two portions of aluminum, a first portion nearest the low pressure environment in thermal contact with the magnets and pole piece to provide thermal conductivity between them, and a second portion enclosing the bearings.

9. A magnetic fluid sealing device comprising:
 a) a housing;
 b) a shaft rotatably mounted in said housing;
 c) at least two permanent magnets mounted in said housing coaxially of said shaft;
 d) a pole piece disposed coaxially between said magnets with a thin walled section of the pole piece radially separating the magnets from the shaft; and
 e) an integral extension of the pole piece forming, with the pole piece, a vacuum tight static envelope between a low pressure and a high pressure environment.

10. The device of claim 9, including a mounting means external to the housing nearest the low pressure environment, and wherein the pole piece extension extends to and is in thermal contact with said mounting means.

11. A method of forming a rotary shaft and a seal for the rotary shaft, the shaft being formed of first and second ends axially extending between a low pressure, high temperature atmosphere and a high pressure ambient temperature atmosphere further comprising the steps of:
 a) forming a magnetic seal about an axial extension of the shaft using a pair of magnets spaced apart by a magnetic pole structure;
 b) extending the magnetic pole structure coaxial to the shaft on a low pressure side thereof to form a vacuum envelope radially about the shaft between the low and high pressure atmospheres.

12. The method of claim 11 including forming a portion of the shaft adjacent the seal of an outer tubular member of steel and an inner core of aluminum to provide a first thermal shunt between the ends of the shaft.

13. The method of claim 11, wherein the pole structure is formed with an integral thin wall section and radially disposing the section between the shaft and the magnets, the section being sufficiently strong to support the pressure difference between the low pressure atmosphere and the high pressure atmosphere, but sufficiently thin to become magnetically saturated by the magnets.

14. The method of claim 11, including the step of forming a first portion of the shaft nearest the low pressure atmosphere of magnetic stainless steel, and forming a second portion of the shaft nearest the high pressure of solid carbon steel.

15. The method of claim 11, wherein a housing formed of two portions of aluminum is provided to house the shaft and seal, and wherein a first portion of the housing nearest the low pressure atmosphere is placed in thermal contact with the magnets and pole structure to provide a heat sink for thermal conduction from the high temperature atmosphere to the low temperature atmosphere, and a second portion encloses bearings which support the shaft.

16. A method of forming a seal for a rotary shaft having first and second ends and axially extending between a low pressure, high temperature atmosphere and a high pressure ambient temperature atmosphere comprising the steps of:
 a) forming a magnetic seal about radial gaps provided between the shaft using magnetic energy provided by magnets axially spaced apart by a magnetic pole structure and coaxial to said shaft;
 b) extending the magnetic pole structure coaxial to the shaft on a low pressure side thereof to form a vacuum envelope radially about the shaft between the low and high pressure atmospheres; and
 c) forming the shaft in sections, one of which is adjacent the magnetic seal and includes a core of aluminum.

17. The method of claim 16, wherein the pole structure is formed with a thin wall section and radially disposing the section between the shaft and the magnets, the section being sufficiently strong to support the pressure difference between the low pressure atmosphere and the high pressure atmosphere, but sufficiently thin to become magnetically saturated by the magnets.

18. A magnetic fluid sealing device comprising:
 a) a housing adapted to be disposed between a low pressure environment and a high pressure environment;
 b) an axially extending shaft rotatably mounted in said housing and wherein one end of the shaft is adapted to be disposed at the low pressure environment and another end at the high pressure environment;
 c) a pole piece and magnets radially encircling said shaft;
 d) a magnetic fluid seal enclosing said shaft for magnetic sealing of any gaps between the shaft and the pole piece; and e) a flange nearest the low pressure environment for mounting the device to a fixture, and wherein a section of the pole piece extends to the mounting means coaxially of the shaft forming with the pole piece a static vacuum tight envelope between the low pressure environment and the high pressure environment, except for said gaps which are sealed by said magnetic seal;

and wherein the section is a thin walled tubular portion of the pole piece which forms a first thermal resistance between the flange and the seal; and wherein the housing is formed of two portions of aluminum, a first portion nearest the low pressure environment in thermal contact with the magnets and pole piece and a second enclosing the bearings; and including an intermediate shaft portion extending from the first portion of the housing to the flange and having a tubular core of thermally insulated material.

19. The device of claim 18, wherein the tubular section of the pole piece extends outside the housing coaxial to the intermediate shaft portion.

20. A magnetic fluid sealing device comprising:
   a) a housing adapted to be disposed between a low pressure environment and a high pressure environment;
   b) a shaft rotatably mounted in said housing;
   c) at least two permanent magnets mounted in said housing coaxially of each other and said shaft;
   d) a pole piece disposed coaxially between said magnets with a thin walled section of the pole piece radially separating the magnets from the shaft;
   e) an extension of the pole piece forming, with the pole piece, a vacuum tight static envelope between the low and high pressure environment; and
   f) a mounting means external to the housing nearest the low pressure environment, and wherein the pole piece extension extends to and is in thermal contact with said mounting means;

and wherein the shaft is formed of four sections, a first section closest to the low pressure environment of magnetic metal, a second section axially adjacent the first section having a high thermally insulative axially extending interior, a third section radially adjacent the magnets having a high thermally conductive axially extending interior and a fourth section having a solid core of highly thermally conductive metal extending beyond the housing into the high pressure environment.

21. A method of forming a seal for a rotary shaft having first and second ends and axially extending between a low pressure, high temperature atmosphere and a high pressure ambient temperature atmosphere comprising the steps of:
   a) forming a magnetic seal about an axial extension of the shaft using a pair of magnets spaced apart by a magnetic pole structure;
   b) extending the magnetic pole structure coaxial to the shaft on a low pressure side thereof to form a vacuum envelope radially about the shaft between the low and high pressure atmospheres;

and wherein a housing formed of two portions of aluminum is provided to house the shaft and seal, and wherein a first portion of the housing nearest the low pressure atmosphere is placed in thermal contact with the magnets and pole structure, and a second portion encloses bearings which support the shaft, including forming an intermediate shaft portion extending from the first portion of the housing to a flange with a tubular core of thermally insulated material.

22. The method of claim 21, including extending a tubular section of the pole structure outside the housing coaxial to the intermediate shaft portion.

\* \* \* \* \*